No. 640,174. Patented Jan. 2, 1900.
C. J. BERG & E. NILSON.
BICYCLE WHEEL.
(Application filed Sept. 5, 1899.)
(No Model.)
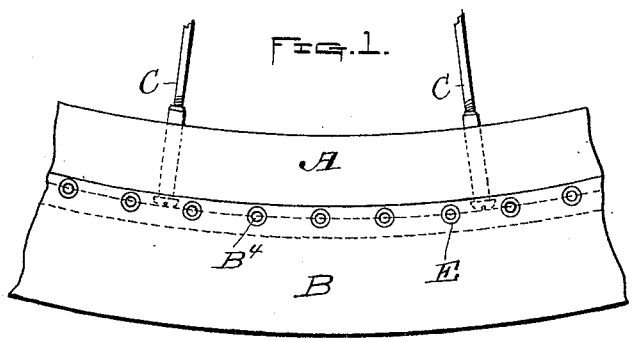
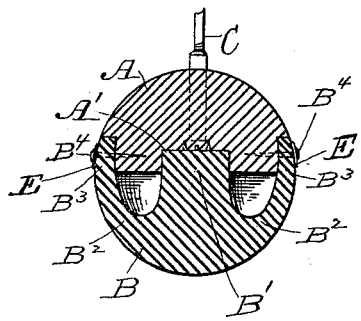 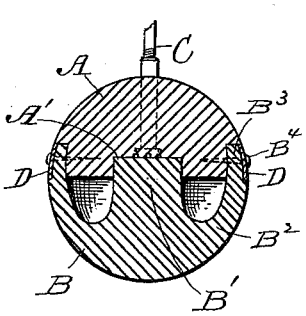 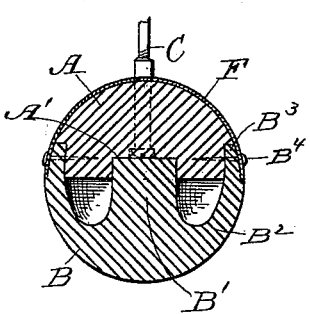
Witnesses;
W. B. Nourse.
A. A. Gilbert.
Inventors;
Carl Johan Berg.
Elof Nilson.
By A. A. Barker, Att'y.

UNITED STATES PATENT OFFICE.

CARL JOHAN BERG AND ELOF NILSON, OF WORCESTER, MASSACHUSETTS.

BICYCLE-WHEEL.

SPECIFICATION forming part of Letters Patent No. 640,174, dated January 2, 1900.

Application filed September 5, 1899. Serial No. 729,469. (No model.)

*To all whom it may concern:*

Be it known that we, CARL JOHAN BERG and ELOF NILSON, of the city and county of Worcester and State of Massachusetts, have invented certain new and useful Improvements in Bicycle-Wheels; and we do hereby declare that the following is a full, clear, and exact description thereof, reference being had to the accompanying drawings, forming a part of this specification, in which—

Figure 1 represents a side view of part of a bicycle-wheel embodying our improvements. Fig. 2 is a transverse section through the parts shown in said Fig. 1; and Figs. 3 and 4 are similar sections to Fig. 2, showing modifications in the construction, which will be hereinafter described.

The object of our invention is to provide a tire for bicycle-wheels combining in a measure the advantages of a pneumatic tire with those of a solid tire; and it consists of a solid rim of substantially semicylindrical form and having a central annular groove in its flat face, also having each side recessed a short distance in from said flat face and toward the center of the rim; an elastic tire of substantially semitubular form having a central internal annular flange with the stock at each side thereof thick and tapering to thin edges, the end of said flange being fitted in the annular groove in the rim and the thin edges in the recessed sides of said rim, and means for fastening said edges to the rim, as will be hereinafter more fully set forth.

In order that others may better understand the nature and purpose of our invention, we will now describe it more in detail with reference to the accompanying drawings.

In said drawings, A represents part of the inner rim, B part of the outer elastic tire, and C parts of the wire spokes, of our improved bicycle-wheel.

The inner rim A is made substantially in the form of a half-round in cross-section with the rounded or circular side upon the inner side and the flat side upon the outer side next to the tire B. Said tire is made of substantially semitubular form with a solid central longitudinal flange $B'$ extending inward and adapted to bear against the flat portion of the solid rim with the end of said flange resting in a central longitudinal groove $A'$, formed in said rim.

The tire B is made with the stock at each side $B^2$ $B^2$ of flange $B'$ quite thick and tapered to about the thickness of the usual rubber tires at the edges $B^3$ $B^3$, where they are fastened to the rim. Said edges may be fastened in various ways, and we therefore do not limit ourselves to any special method. They are preferably fastened, however, by first gluing the edges to the rim and then tacking them, the tacks $B^4$ being driven at a short distance apart, as is shown in Figs. 1 and 2. The rim is recessed at the outer edges, the depth of the thickness of the edges of the tire, so that when the parts are fitted and fastened together the outer surfaces of the rim and tire will form a circle, as is shown in the drawings, thereby presenting a neat appearance on the wheel.

By the foregoing construction it is obvious that a good strong rim is provided, having a tire with sufficient sustaining power to support the wheel and rider without crippling or collapsing, (owing to the central supporting-flange $B'$, which receives the principal part of said weight,) which also has sufficient elasticity to produce an easy-riding wheel on account of the thinner side edges of the tire, which allow said flange to yield upward toward the wheel and to either side when striking obstructions in traveling over rough or uneven ground.

The proportions of the central solid portion or flange $B'$ of the tire to that of the aforesaid laterally-supporting side edges $B^2$ $B^2$ is in practice varied to the size of the wheel and weight to be carried thereon, a large stronglybuilt wheel for heavy persons of course requiring the rim to be made larger, and the tire thicker at both the center and sides than for small light-weight wheels.

A tire constructed as shown and described, it is obvious, embodies the advantages of both a solid and a tubular pneumatic tire, being nearly as firm in its sustaining power as a solid tire, while also being nearly or quite as elastic as said pneumatic tires. Being solid over the central and principal bearing-point, punctures have no effect either at said point or through the thinner portions at the sides, as the tire is not dependent upon air to sustain or hold it in its proper normal shape.

Although our invention is designed principally for use on bicycles, as it is equally applicable to the wheels of vehicles we reserve the right to apply the same to either in practice.

In Fig. 3 we have shown the fastened edges of the tire B reinforced by placing a thin metal strip D over each edge, through which the fastening-tacks are passed. When said strips are not used, thin washers E are preferably used under the tack-heads, as is shown in Figs. 1 and 2.

A still firmer support for the wheel may be obtained by fitting a sheet-metal cover F over the rim A, whose edges are adapted to lap over the edges of the rubber tire and through which edges the tacks may be driven, as in the case of the strips D. This construction is of advantage when it is desired to have the exterior of the rim present a nickel-plated or other finished metal surface without making the whole rim of metal.

The wire spokes C are arranged and secured in our improved wheel in a manner similar to those in other bicycle-wheels.

Having now described our invention, what we claim therein as new, and desire to secure by Letters Patent, is—

1. In a bicycle-wheel, a solid rim of substantially semicylindrical form and having a central, annular groove in its flat face, also having each side recessed a short distance in from said flat face and toward the center of the rim, in combination with an elastic tire of substantially semitubular form, having a central, annular flange projecting inward therefrom, with the stock at each side thereof thick and tapering to thin edges, the end of said flange being fitted in the annular groove in the rim and the thin edges in the recessed sides of said rim, and means for fastening said edges to the rim, substantially as and for the purpose set forth.

2. In a bicycle-wheel, a solid rim of substantially semicylindrical form and having a central annular groove in its flat face, also having each side recessed a short distance in from said flat face and toward the center of the rim, in combination with an elastic tire of substantially semitubular form, having a central annular flange projecting inward therefrom, with the stock at each side thereof thick, and tapering to thin edges, the end of said flange being fitted in the annular groove in the rim and the thin edges in the recessed sides of said rim; a metallic cap fitted over the rim and overlapping the edges of the tire, and means for fastening the edges of said tire and cap to the rim, substantially as and for the purpose set forth.

CARL JOHAN BERG.
ELOF NILSON.

Witnesses:
  A. A. BARKER,
  W. B. NOURSE.